United States Patent [19]
Plasser et al.

[11] 3,857,183
[45] Dec. 31, 1974

[54] MOBILE TRACK SURVEY APPARATUS

[76] Inventors: Erna Plasser; Josef Theurer, both of Johannesgasse 3, Vienna, Austria A-1010; Franz Eglseer, Kleinreith Nr. 32, Ohlsdorf, Austria A-4694

[22] Filed: July 9, 1973

[21] Appl. No.: 377,453

[30] Foreign Application Priority Data
Aug. 3, 1972  Austria .............................. 6692/72

[52] U.S. Cl............................................. 33/174 R
[51] Int. Cl.............................................. B61k 9/00
[58] Field of Search ............ 33/144, 286, 287, 338, 33/375, 174 R, 1 Q; 104/7 R

[56] References Cited
UNITED STATES PATENTS
| | | | |
|---|---|---|---|
| 610,848 | 9/1898 | Livtschak.............................. | 33/144 |
| 721,933 | 3/1903 | Bennett............................ | 33/174 R |
| 2,045,563 | 6/1936 | Benson.............................. | 33/174 R |
| 3,514,862 | 6/1970 | Helgemeir......................... | 104/7 R |
| 3,594,912 | 7/1971 | Sauterel............................... | 33/338 |

*Primary Examiner*—Harry N. Haroian
*Assistant Examiner*—John W. Shepperd
*Attorney, Agent, or Firm*—Kurt Kelman

[57] ABSTRACT

Three rail sensors are spaced apart in the direction of track elongation and are vertically movable in respect of a frame supported on undercarriages for movement on the track. The intermediate rail sensor is constituted by one of the undercarriages resiliently supporting the frame. Connecting elements extending in the direction of track elongation universally link each of the two other rail sensors to the intermediate undercarriage. A transducer means converts any relative movement of the connected rail sensors in respect of each other into an electrical error signal proportional to the relative movement, and a recorder is connected to the transducer means for indicating the error signal.

9 Claims, 7 Drawing Figures

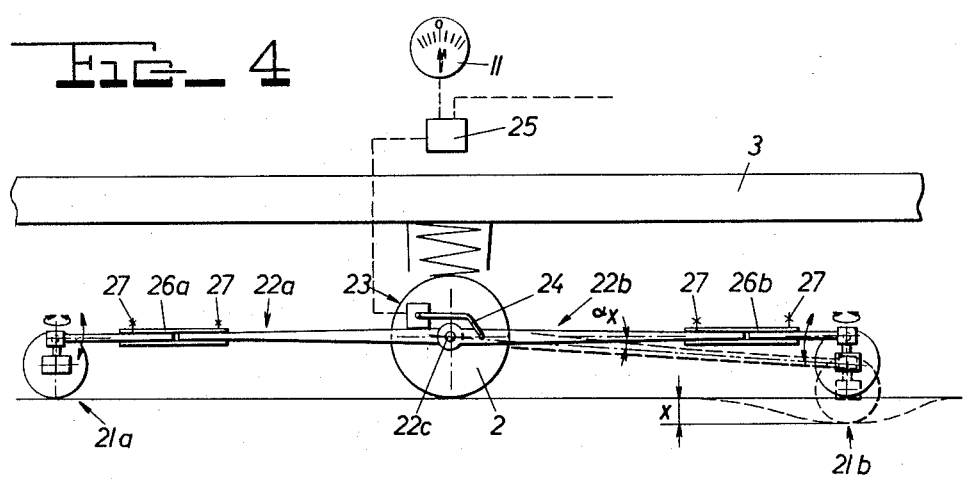
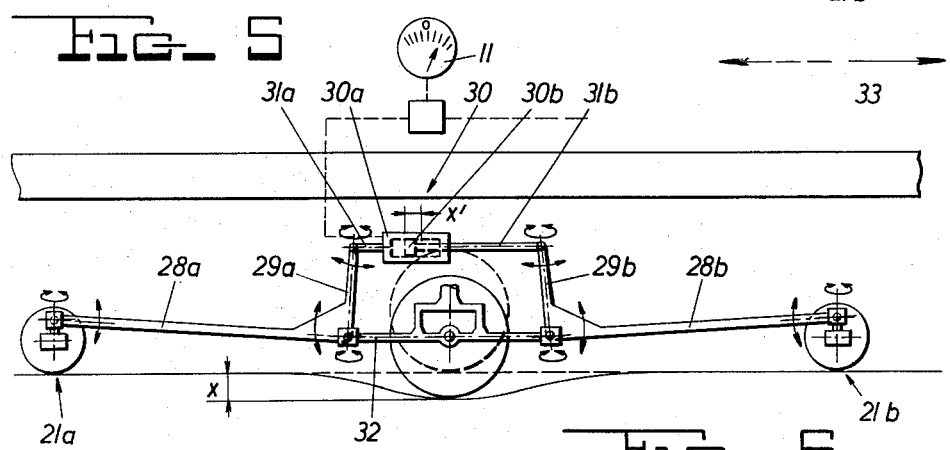
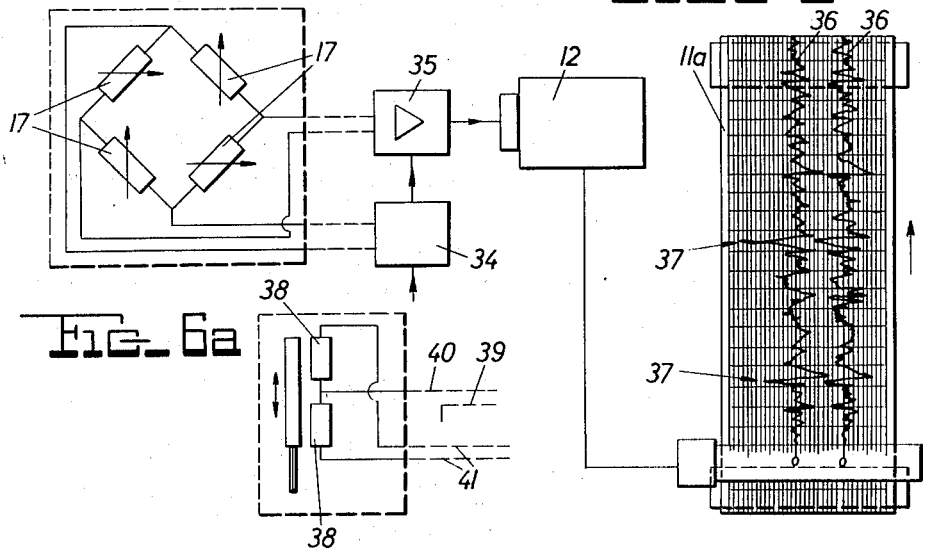

MOBILE TRACK SURVEY APPARATUS

The present invention relates to improvements in mobile apparatus for surveying the vertical position or warpage of the rails of a track whereon the apparatus is adapted to run.

Such apparatus is designed to determine or survey the geometric condition of track rails, for instance the warpage of the rails at rail joints, track warpage being defined as follows: if four points on the track are considered, two on each of the track rails, three of these points define a plane and the distance of the fourth point from this plane constituting the warpage.

Conventional track surveying apparatus of this general type comprises a frame, undercarriages supporting the frame for movement on the track, and three rail sensing means, such as surveying bogies and/or undercarriages with flanged wheels engaging the track rails, spaced apart in the direction of track elongation and being vertically movable in respect of the frame for surveying at least one of the track rails. Transducer means is provided for converting any relative movement of the three rail sensing means in respect of each other into an electrical error signal proportional to the relative movement, and recording means is connected to the transducer means for indicating the error signal.

In such apparatus, it has been proposed to eliminate the disadvantageous influence of the vibrations of the frame on the survey results by associating a transducer with each of three undercarriages. The three transducers are so connected that the two outer undercarriages of wheel axles constitute the survey or measuring base while the intermediate undercarriage or wheel axle constitutes the surveying means whose movements in respect of the base are surveyed and recorded. Particularly because of the number of transducers, this apparatus is expensive and complex.

Other known apparatus of this type uses at least partially mechanical elements for transmitting the survey parameters. This has the disadvantage that the vibrating frame unfavorably influences the survey results through the transmission of the survey parameters from the rail sensing means to the frame.

U.S. Pat. No. 3,735,495, dated May 29, 1973, seeks to solve this problem by using two rail sensing means, i.e. one undercarriage and one surveying bogie or axle interconnected by a bell crank lever. Flexible rods carrying strain gages are used as transducer to measure or survey any track warpage under the undercarriage in respect of the surveying bogie or axle. This arrangement makes it possible not only to survey permanent track warpage but also elastically yielding low points along the track which yield under the load of the undercarriage running thereover because the ballast at such points is insufficiently compacted. While this structure has been used very successfully in track survey operations, vertical rail position determination at only two points has not been found sufficient in some instances.

It is accordingly a primary object of this invention to provide a mobile track survey apparatus which measures the vertical position or warpage of the rails of a track at least at three points spaced apart in the direction of track elongation but which is of simpler structure than known apparatus of this type.

This and other objects are accomplished according to the invention by using one of the undercarriages at least as the intermediate one of the three rail sensing means, which one undercarriage resiliently supports the frame of the apparatus. Connecting elements extend substantially in the direction of track elongation and link each of the two other sensing means to the intermediate sensing means constituted by the one undercarriage. Universal joint means connect the connecting elements to the rail sensing means whereby the relative movements of the three sensing means may be transmitted and indicated. Transducer means converts any relative movement of the connected rails sensing means in respect of each other into an electrical error signal proportional to the relative movement, and recording means connected to the transducer means indicates the error signal.

This arrangement provides a simple and operationally dependable apparatus for surveying track warpage at three points spaced apart along the track. The universal linkage of the sensing means with an undercarriage which non-resiliently or fixedly supports the frame also enables the rail warpage to be surveyed in curves without any errors in results, as in known apparatus.

According to one preferred feature of the present invention, the structure is made particularly simple by associating a single transducer means with the three rail sensing means. This single transducer means converts any relative movements of the two other sensing means in respect of any movements of the intermediate sensing means into the electrical error signals. In such an arrangement, it is very advantageous to use substantially vertically freely moveable and load-free surveying bogies as the two other sensing means so that the condition of the track may be determined or surveyed as well as the geometric position thereof.

In accordance with another preferred feature, the connecting elements are rods, each rod having one end linked to the intermediate rail sensing means and another end linked to the other two sensing means. Pairs of the rods are aligned in the direction of track elongation and define an angle therebetween at the one ends. The angle varies in proportion to any relative movement of the other sensing means in respect of the intermediate rail sensing means, and the transducer means is arranged in the region of the one rod ends for converting the varying angles into the proportional error signals. Such an arrangement constitutes a particularly simple structure and provides many structural possibilities for mounting the transducer means in the region of the one undercarriage. It is also very adaptable because the reference lengths may be readily changed either replacing the connecting rods by rods of different lengths or by using telescoping rods whose length may be adjusted.

Particularly accurate measurements with a solid reference base are obtained in a preferred embodiment of this invention wherein the connecting elements include, in association with each rail, a two-armed lever having a fulcrum pivotally mounted on the intermediate rail sensing means, a pair of bell crank levers of the same lever ratio symmetrically arranged in respect of the intermediate rail sensing means, and each bell crank lever having a fulcrum universally linked to a respective one of the outer ends of the two-armed lever and one arm universally linked to a respective one of the other sensing means. The transducer means is connected to at least one of the other arms of the bell crank levers.

In this preferred embodiment, the transducer means may comprise a piston-and-cylinder device interconnecting the other arms of the bell crank lever. Such an arrangement may advantageously use an inductive transducer, for instance a potentiometer, the cylinder being connected to the part forming the measuring or reference base, i.e. the end of the other arm of one of the bell crank levers, and the piston being connected with the end of the other arm of the other bell carnk lever.

However, highly accurate measurements at high running speeds of the mobile apparatus may be effected by having the lower portion of the other arm of one of the bell crank levers constituted as a flexible or elastic rod, with the transducer means being a strain gage mounted on the flexible rod portion. This produces a very sensitive transmission and an accurate recording because of the direct conversion of the movements into the proportional error signals while the mass of the transmission elements is small.

The frame of the surveying apparatus may be that of a mobile track leveling machine, in which case the transducer means may be operatively connected with the drive for the track lifting tools so that the track leveling may be directly controlled by the survey data, rather than being merely recorded. The survey data may also be stored on punched cards and the punched cards may be used to control the track leveling operation.

The above and other objects, advantages and features of the present invention will be better understood from the following detailed description of certain now preferred embodiments thereof, taken in conjunction with the accompanying drawing wherein FIG. 1 is a side elevational view of a track survey car schematically showing various track condition survey apparatus, including the arrangement of the apparatus of this invention on the frame of the car;

FIGS. 4 and 5 are like side elevational views of two further embodiments of such apparatus;

FIG. 6 is a circuit diagram including strain gage means as the transducer; and

FIG. 6a is a partial circuit diagram including an inductively operating transducer.

Figure 1:
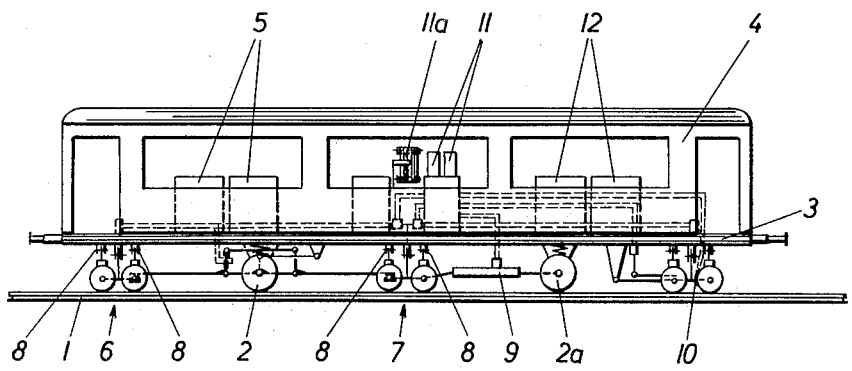

Referring now to the drawing and first to FIG. 1, the illustrated track survey car is shown to comprise frame 3 and undercarriages 2, 2a supporting the frame for movement on track rails 1, 1, spring means being interposed between the undercarriages and the frame so that frame 3 is resiliently supported on the undercarriages in a manner well known per se. The survey car may be self-propelled, a drive motor 5 being coupled to one of the undercarriages for moving the car along the track.

As will be more fully explained in connection with the description of FIG. 2, undercarriage 2 serves as the intermediate rail sensing means of the apparatus of the present invention, the undercarriage having flanged wheels engaging the rails and sensing their vertical position. Double-axled surveying bogies 6 and 7, which are substantially freely vertically movably mounted on frame 3, constitute the two other rail sensing means on either side of undercarriage 2, the three sensing means 6, 2 and 7 being spaced apart in the direction of track elongation. Hydraulic jacks 8 mount the surveying bogies on frame 3 so that the bogies may be lifted off the track when desired, flanged wheels on the two axles of each bogie engage the rails and sense their vertical position. The hydraulic jacks may be used not only to lift the bogies but also for pressing each of of their axles into sensing engagement with the track rails.

The illustrated survey car also comprises survey apparatus for determining other track condition parameters, which do not form part of this invention, including apparatus 9 for surveying the track camber and apparatus 10 for surveying the track gage. Each survey apparatus on the car includes a transducer producing an error signal proportional to the surveyed track condition, which error signals are transmitted by a suitable electrical circuit shown in broken lines in FIG. 1 to indicator and recording instruments 11 and 11a mounted on the car. The survey car may also carry computor and information storage devices 12 for the storage and application of the survey signals in subsequent track correction operations.

Figure 2:
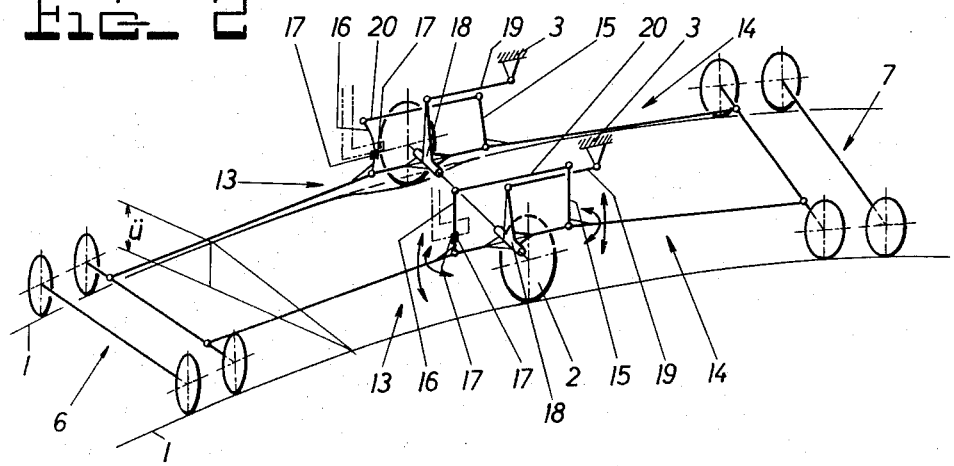
FIG. 2 is a schematic perspective view of a survey apparatus according to the invention in operation in a track curve.

As will be seen in FIG. 2, the surveying bogies 6 and 7 are free of the load of the car frame, one of the axles of each bogie being connected to undercarriage 2 by respective bell crank levers 13 and 14. One pair of bell crank levers 13, 14 is associated with each rail 1 and the bell crank levers of each pair are aligned in the direction of track elongation. The bell crank levers are symmetrically arranged in respect of intermediate undercarriage 2. The connecting elements between the undercarriage and two surveying bogies include, in association with each rail, a two-armed lever 18 operating like a balance beam and being constituted, for instance, by the axle bracket of the undercarriage. Each bell crank lever has a fulcrum universally linked, as shown by arrows, to a respective one of the outer ends of two-armed lever 18 and one arm substantially parallel to the associated rail universally linked to one of the axles of a respective one of the surveying bogies 6 and 7. The other arm of the bell crank levers 14, which extends upwardly from the fulcrum, is a rigid arm 15 while the other arm of bell crank levers 13 are upwardly extending elastically deformable or flexible rods 16. Strain gage means 17 are mounted on the rods 16 and constitute the transducer means of this embodiment. A link 19 having one end pivoted to a bracket on frame 3 and another end pivoted to two-armed lever 18 controls the pivoting moment of lever 18 while the free ends of the upwardly extending bell crank lever arms 15 and 16 are interconnected by tension rod 20 whose ends are linked to the free ends.

The strain gage means 17 on the elastically deformable rods 16 are electrically connected to indicator instrument 11 (or recording instrument 11a), as will be explained in detail hereinbelow in connection with the description of FIG. 6. When the wheel of one of the sensing means is moved out of the straight line defined by the wheels of the two other sensing means by a warpage in the rail, as shown by one of the wheels of undercarriage 2 in FIG. 2, the corresponding elastically deformable rod 16 is correspondingly deformed and the strain gage 17 mounted on this rod emits an error signal proportional to the deformation of the rod. The two-armed lever 18 connected to the undercarriage 2 is moved in a vertical direction by this warpage in the underlying rail, causing the two bell crank levers 13, 14 associated with this rail to be pivoted about their universal joints connecting them to surveying bogies 6 and 7. Therefore, since the illustrated warpage is a depression in the rail, i.e the two-armed lever 18 is moved downwardly, the upwardly extending arms 16 and 15 of levers 13 and 14 pivot towards each other, thus causing a deformation of rod 16 is proportion to the relative movement of arms 15 and 16, the two-armed lever 18, the tension rod 20 and arms 15, 16 being linked together in a quadrangle.

Figure 3:
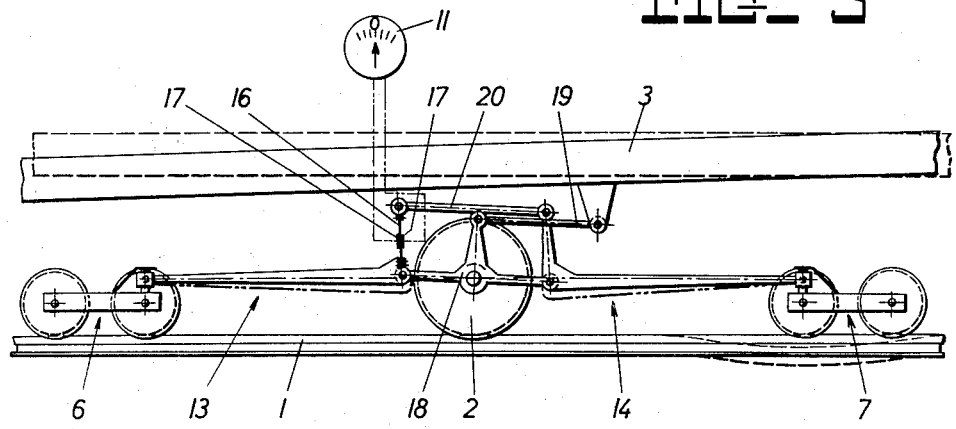
FIG. 3 is a side elevational view of the apparatus of FIG. 2.

If frame 3 of the apparatus is resiliently mounted on undercarriage 2, none of the elastically deformable rods will be deformed, the position of the frame due to the resilient movement on undercarriage 2 being shown in full lines in FIG. 3. The resilient movement of frame 3 causes the two-armed lever 18 to be pivoted about the axle of undercarriage 2 by means of the lever 19 which links lever 18 to frame 3. This pivotal movement of lever 18 causes levers 13 and 14, whose fulcrums are linked to the outer ends of the arms of lever 18, to be pivoted in the same direction, i.e. counterclockwise, the two arms of lever 18, arms 15 and 16 of bell crank levers 13 and 14, and tension rod 20 forming a parallelogram. Thus, no deformation of rod 16 takes place when the frame 3 is resiliently mounted, and no error signal is produced by strain gage means 17.

When the frame assumes the position shown in full lines in FIG. 3, due to the resilient movement of the frame on the undercarriage, while the surveying bogie 7 senses the warpage (depression) of rail 1 indicated in broken lines, the bell crank levers 13, 14 will assume the pivotal position indicated in dash-and-dot lines. The different survey conditions due to the use of surveying bogies subjected to a load or free of any load will be explained hereinbelow in connection with the description of FIG. 5.

In the embodiment of FIG. 4, the sensing means on either side of undercarriage 2 are single-axle surveying bogies 21a, 21b and the connecting elements connecting the surveying bogies to the intermediate undercarriage are straight rods 22a, 22b. One end of each connecting rod is linked to the axle of undercarriage 2 by universal joint 22c. Connecting rod 22a carries the housing of an inductive transducer 23 which converts the distance of any pivotal movement of rod 22b into a proportional error signal by means of a movable sensing lever 24 of transducer 23 which engages rod 22b to sense its pivotal position. Such an inductive transducer is associated with each rail and any error signal emanating therefrom is electrically transmitted with amplifier 25, the amplified signal being transmitted to indicator instrument 11. The inductive transducer may be any suitable type of inductive device with a pivotal armature or a potentiometer.

To make it possible to change the length of the reference base, the length of the connecting rods may be adjustable. The illustrated length adjustment means comprises a connecting sleeve 26a, 26b telescopingly receiving the inner ends of the two parts of the connecting rods. These inner ends may be held in any desired position within the connecting sleeves, clamps or setscrews 27 being provided to fix the rod parts in their selected position.

When surveying bogie 21b runs over a warped rail at a point vertical displaced from a straight line by distance x (indicated in broken lines), the connecting rods 26b will be pivoted through angle $\alpha_x$, which will be sensed by sensing lever 24 of the inductive device 23. A corresponding error signal will accordingly be transmitted to indicator 11.

FIG. 5 illustrates an embodiment wherein the connecting elements are bell crank levers 28a, 28b (as in the embodiment of FIGS. 2 and 3) whose fulcrums are universally linked to the outer ends of two-armed lever 32 mounted on the intermediate undercarriage. To simplify the illustration, the connection of lever 32 to frame 3 has not been shown in this figure, the same linkage being provided, if desired, as in the embodiment of FIGS. 2 and 3. In contrast to the latter embodiment, however, all the upwardly extending arms 29a, 29b of the bell crank levers are rigid.

The transducer means in this embodiment comprises a piston-and-cylinder device interconnecting the arms 29a, 29b, of the bell crank levers. As shown, the cylinder housing 30a of a plunger-type armature device 30 is linked to arm 29a by means of rod 31a while the other arm of bell crank lever 28a is linked by a universal joint to single-axle surveying bogie 21a. The surveying bogie 21b is similarly universally linked to one arm of bell crank lever 28b while its other arm 29b is universally linked to piston rod 31b which carries piston or armature 30b extending into the cylinder 30 of the inductive transducer. When the undercarriage holding two-armed lever 32 is vertically displaced by distance x at a warped rail point, the rigid bell crank lever arms 29a, 29b will swing towards each other, thus displacing the cylinder 30a and piston 30b relative to each other by proportional distance $x'$. This will produce an error signal proportional to the displacement $x'$, which is transmitted to indicator 11.

Double-headed arrow 33 indicates that the apparatus will operate equally well in either working direction without changing the structure, this applying also to the other illustrated embodiments.

In all three embodiments hereinabove described, elastic depressions in the rails due to insufficient ballast support of the track ties may be detected by the intermediate undercarriage which is subjected to the load of the apparatus and will thus depress any rail portion which is insufficiently supported by the ballast to sustain the load when the apparatus travels over such a rail portion. On the other hand, permanent deformations of the rails, i.e., rail warpage, will be detected by the surveying bogies which are free to move vertically in response to such warpage because they are not subjected to the load of the apparatus.

For instance, referring to FIG. 3, the potential rail deformation shown in broken lines will not be registered by unloaded surveying bogie 7 because it will become a warped rail portion only under a load sufficient elastically to deform this potion. As shown in FIG. 5, it would be registered by the apparatus of this invention only when the loaded undercarriage travels thereover, the load on the undercarriage being sufficient to elastically deform this rail portion because the ballast underneath the tie at recording rail point is not sufficiently compacted. On the other hand, if the rail were permanently warped at this point, as shown in broken lines in FIG. 4, this permanent warpage would be registered by an unloaded surveying bogie traveling thereover.

A differentiation of permanent and elastic errors in the rails is possible because the pivoting movement of the surveying bogies in response to permanent errors is only half (see broken lines in FIG. 4) that of the pivoting movement of the undercarriage in response to elastic errors (see FIG. 5).

FIG. 6 shows a circuit diagram for the embodiment wherein strain gage means are used as transducers, the measuring bridge containing the strain gages 17 being connected to voltage source 34 and the output or error signal from the measuring bridge being fed to amplifier 35 which also receives power from voltage source 34. The amplified error signal is fed to computor and signal storage means 12 which, in the illustrated embodiment, is connected to a recording instrument 11a. The illustrated recoridng instrument carries a moving recording band on which the error signals are recorded for both rails as curves 36, 36. The errors in the regions of rail joints are clearly visible at points 37 of the curves.

FIG. 6a schematically illustrates a circuit diagram for the embodiment wherein a plunger-type armature device is used as transducer. A pair of measuring coils 38, 38 are interconnected to form half an inductive bridge, the bridge being completed by two precision resistances (not shown) connected thereto by conductor 39. A conductor 40 coming from coils 38 and conductor 39 transmit the error signal produced by the measuring bridge to an amplifier, such as 35 shown in FIG. 6, and a voltage source again provides power to the bridge, via conductor 41, and the amplifier.

Instead of being mounted on a track survey car, as shown in FIG. 1, the apparatus of the present invention may very advantageously be mounted on the frame of track leveling machine, in which case the transducer may transmit the error signals to the control operating the track lifting tools, thus correcting the track position automatically without the intervention of an operator.

It will be understood by those skilled in the art that the invention is not limited to the illustrated structures shown and described merely by way of example. Various transducers and/or connecting elements may be used within the scope of this invention as defined in the appended claims.

We claim:

1. A mobile apparatus for surveying the vertical position or warpage of the rails of a track whereon the apparatus is adapted to run, comprising
   1. a frame,
   2. undercarriages supporting the frame for movement on the track,
   3. three rail sensing means spaced apart in the direction of track elongation and being vertically movable with respect of the frame for surveying at least one of the track rails,
      a. at least the intermediate one of the sensing means being constituted by one of the undercarriages,
   4. connecting elements extending substantially in the direction of track elongation and linking each of the two other sensing means to the intermediate sensing means constituted by the one undercarriage,
   5. universal joint means connecting the connecting elements to the rail sensing means,
   6. transducer means converting any relative movement of the connected rail sensing means in respect of each other into an electrical signal proportional to the relative movement, and
   7. recording means connected to the transducer means for indicating the error signal.

2. The mobile surveying apparatus of claim 1, wherein the one undercarriage resiliently supports the apparatus frame.

3. The mobile surveying apparatus of claim 2, wherein the two other sensing means are constituted by substantially vertically freely movable and load-free surveying bogies.

4. The mobile surveying apparatus of claim 1, wherein a single one of the transducer means is associated with the three rail sensing means, the single transducer means converting any relative movements of the two other sensing means in respect of the intermediate sensing means into said electrical error signals.

5. The mobile surveying apparatus of claim 1, wherein the connecting elements are rods, each rod having one end linked to the intermediate rail sensing means and another end linked to the other sensing means, pairs of said rods being aligned in the direction of track elongation and defining an angle therebetween at said one ends, the angle varying in proportion to any relative movement of the other sensing means in respect to the intermediate rail sensing means, and the transducer means being arranged in the region of said one ends for converting the varying angles into said proportional error signals.

6. The mobile surveying apparatus of claim 1, wherein the connecting elements include, in association with each of the rails, a two-armed lever having a fulcrum pivotally mounted on the intermediate rail sensing means, each arm of the lever having an outer end spaced from the fulcrum, a pair of bell crank levers, each bell crank lever having the same lever ratio, the bell crank levers being symmetrically arranged in respect of the intermediate rail sensing means, and each bell crank lever having a fulcrum universally linked to a respective one of the outer ends of the two-armed lever and one arm universally linked to a respective one of the other sensing means, and the transducer means being connected at least to one of the other arms of the bell crank levers.

7. The mobile surveying apparatus of claim 6, wherein the transducer means comprises a piston-and-cylinder device interconnecting the other arm of the bell crank levers.

8. The mobile surveying apparatus of claim 6, wherein the transducer means is connected to the other arm of one of the bell crank levers.

9. The mobile surveying apparatus of claim 8, wherein the other arm has at least a portion constituting a flexible rod and the transducer means is a strain gage mounted on the flexible rod portion.

* * * * *

UNITED STATES PATENT OFFICE
CERTIFICATE OF CORRECTION

PATENT NO. : 3,857,183

DATED : Dec. 31, 1974

INVENTOR(S) : Franz Plasser, Deceased, by Erna Basser et al

It is certified that error appears in the above-identified patent and that said Letters Patent are hereby corrected as shown below:

At /76/, before "Erna" insert --Franz Plasser, deceased, by-- and after "Plasser" insert --, heir--

Signed and Sealed this

Thirty-first Day of May 1977

[SEAL]

Attest:

RUTH C. MASON
*Attesting Officer*

C. MARSHALL DANN
*Commissioner of Patents and Trademarks*